(12) United States Patent
Steer

(10) Patent No.: US 8,154,534 B2
(45) Date of Patent: Apr. 10, 2012

(54) DETECTION OF AN INCIDENT LIGHT DISTRIBUTION

(75) Inventor: William Andrew Steer, Cambridge (GB)

(73) Assignee: Chimei Innolux Corporation (TW)

( * ) Notice: Subject to any disclaimer, the term of this patent is extended or adjusted under 35 U.S.C. 154(b) by 629 days.

(21) Appl. No.: 12/340,240

(22) Filed: Dec. 19, 2008

(65) Prior Publication Data

US 2009/0160815 A1   Jun. 25, 2009

Related U.S. Application Data

(60) Provisional application No. 61/015,658, filed on Dec. 20, 2007.

(30) Foreign Application Priority Data

Sep. 26, 2008  (EP) .................................... 08165314

(51) Int. Cl.
*G06F 3/042*   (2006.01)
(52) U.S. Cl. ......... 345/175; 345/102; 345/176; 345/207
(58) Field of Classification Search ......................... None
See application file for complete search history.

(56) References Cited

U.S. PATENT DOCUMENTS

| 4,149,197 A | 4/1979 | Kos et al. |
|---|---|---|
| 4,449,084 A | 5/1984 | Meno |
| 4,577,099 A | 3/1986 | Goodman |
| 5,428,215 A | 6/1995 | Dubois et al. |
| 5,499,098 A * | 3/1996 | Ogawa .......................... 356/621 |
| 5,604,695 A | 2/1997 | Cantin et al. |
| 5,751,830 A | 5/1998 | Hutchinson |
| 5,811,842 A | 9/1998 | Funaba |
| 6,274,862 B1 | 8/2001 | Rieger |
| 6,717,662 B2 * | 4/2004 | Lange et al. .................. 356/121 |
| 6,765,276 B2 | 7/2004 | Fasen et al. |
| 7,110,901 B2 | 9/2006 | Wada et al. |
| 7,465,914 B2 * | 12/2008 | Eliasson et al. ............... 250/221 |
| 2005/0200293 A1 | 9/2005 | Naugler, Jr. et al. |

FOREIGN PATENT DOCUMENTS

| CN | 1867881 | 11/2006 |
|---|---|---|
| DE | 4410078 | 9/1994 |
| DE | 19748826 | 2/1999 |
| GB | 1567419 | 5/1980 |
| GB | 2337170 | 10/1999 |
| JP | 2001007308 | 1/2001 |

OTHER PUBLICATIONS

Extended European Search Report for European patent application 08165314.
Office Action dated Sep. 15, 2011 from corresponding Chinese Application No. 200810188530.8.

* cited by examiner

*Primary Examiner* — Jason Olson
(74) *Attorney, Agent, or Firm* — Lowe Hauptman Ham & Berner, LLP

(57) ABSTRACT

A device for detecting an incident light distribution. The device has an array of light sensors, and a shadow casting element spaced above the light sensor array, with the shadow casting element between the incident light to be modeled and the sensor array. A processor interprets a cast shadow detected by the light sensor array thereby to derive information relating to the directional distribution of the incident light.

13 Claims, 3 Drawing Sheets

DETECTION OF AN INCIDENT LIGHT DISTRIBUTION

CROSS REFERENCE TO RELATED APPLICATIONS

This application claims priority of U.S. Provisional Application No. 61/015,658, filed Dec. 20, 2007, and claims the priority of EP Application No. 08165314.9., filed Sep. 26, 2008, the entirety of which is incorporated by reference herein.

BACKGROUND OF THE INVENTION

1. Field of the Invention

This invention relates to the detection of the characteristics of an incident light distribution, particularly but not exclusively for use with display devices including a touch input.

2. Description of the Related Art

Various touch-screen technologies are well-known and widely used. They include so-called 'resistive' and 'capacitive' technologies. Most such technologies however add significant cost and complexity to a display module, and impair front-of-screen performance.

There is some interest in using photodiodes or other light sensors within the display matrix to detect light from the display scattered back by a finger placed on the screen surface and/or detect ambient-light shadows cast by fingers or a stylus held against the screen. Such approaches offer a low-cost and highly integrated route to providing basic 'touch-screen' functionality.

However, using light sensing in order to detect the presence and position of a user's finger is not accurate. In particular, the user's finger makes contact with the top surface of the display device, whereas the sensor circuitry is most preferably integrated into the active plate of the display. The spacing between the active plate and the surface of the display means that a point of contact cannot be derived unambiguously from a shadow cast. This problem is compounded if there is more than one directional light source.

BRIEF SUMMARY OF THE INVENTION

According to the invention, there is provided a system for displaying image. The system for displaying image includes a device for detecting an incident light distribution (or named incident light detecting device). The incident light detecting device comprises an array of light sensors, a shadow casting element spaced above the light sensor array, and a processor. The shadow casting element is between the incident light to be detected and the sensor array. The processor is operable to interpret a cast shadow detected by the light sensor array thereby to derive information relating to the directional distribution of the incident light.

This arrangement uses a shadow cast from an element of known shape and position in order to derive information about the incident light.

The processor can also be adapted to derive information relating to the colour distribution of the incident light. In one example, the processor is adapted to derive a representation of the incident light as originating from one or more light sources in different positions.

In one example of use of the device, the information derived can be used in a lighting device in which a light output device is controlled in dependence on the information relating to the directional distribution of the incident light. This can be used to generate lighting effects which are dependent on the ambient light properties.

The shadow analysis can instead be used to interpret shadows of elements of unknown shape or position. Thus, the information derived can be used in a shadow detection system, in which a second array of light sensors is provided for detecting a shadow cast by a user of the device. A processor is provided for interpreting the shadow cast by the user of the device, which uses the information relating to the directional distribution of the incident light.

This shadow detection system can be used in a display device with a touch input, in which the display device further comprises an array of display pixels.

This arrangement improves the accuracy of a simple light sensing touch input system. The system can be implemented with low cost, and may for example be used for a coarse resolution touch sensitive input system.

Preferably, the array of display pixels comprises an array of pixel circuits, wherein the second array of light sensors is integrated with the pixel circuits. This provides low cost integration of the light sensor array into the display active plate, which carries the pixel circuits. The display device preferably comprises a liquid crystal display.

The shadow casting element can be arranged outside the display output area, so that the light modelling function does not disturb the display output, but is nearby so that the light at the touch input of the display device is represented by the modelling. The shadow casting element can be arranged at the edges and/or corners of the display output area.

The invention also provides a method of detecting an incident light distribution. The method uses a shadow casting element spaced above a light sensor array to cast a shadow on the light sensor array, and interprets the cast shadow detected by the light sensor array thereby to derive information relating to the directional distribution of the incident light.

This method can be part of a method of providing a light output, in which a light output device is controlled in dependence on the information relating to the directional distribution of the incident light.

Alternatively, the method can be part of a method of interpreting a touch input to a touch input device, in which a shadow cast by a user of the device is detected and interpreted using the information relating to the directional distribution of the incident light.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows embodiments carrying out the invention. This description is made for the purpose of illustrating the general principles of the invention and should not be taken in a limiting sense. The scope of the invention is best determined by reference to the appended claims.

The invention provides detection and analysis of a light distribution so that shadows cast or light scattering can be interpreted. The invention uses a shadow cast from an element of known shape and position in order to derive information about the incident light. This in turn can be used to provide desired lighting effects, or to interpret shadows of elements of unknown shape or position in a touch sensor device.

In its preferred implementation, as a display device with touch input based on detecting shadows cast or localised scattering, the invention uses known light sensing technology to implement a touch sensing function. Although this approach has only recently been considered, the use of integrated light sensors is well known, for example for detecting ambient light levels, the ambient light level in turn being used for backlight control.

Before describing the invention, the known light sensor configuration will be described used in a liquid crystal display. Liquid crystal displays typically comprise an active plate and a passive plate between which liquid crystal material is sandwiched. The active plate comprises an array of transistor switching devices, typically with one transistor associated with each pixel of the display. Each pixel is also associated with a pixel electrode on the active plate to which a signal is applied for controlling the brightness of the individual pixel.

Light sensors can be formed as part of the active plate using thin film technology, and this is a convenient way of adding the light sensor capability without requiring additional process steps or separate components. The light sensitive devices may for example be thin film transistors, thin film diodes, lateral diodes or light sensitive resistors or other photosensitive devices.

Figure 1:
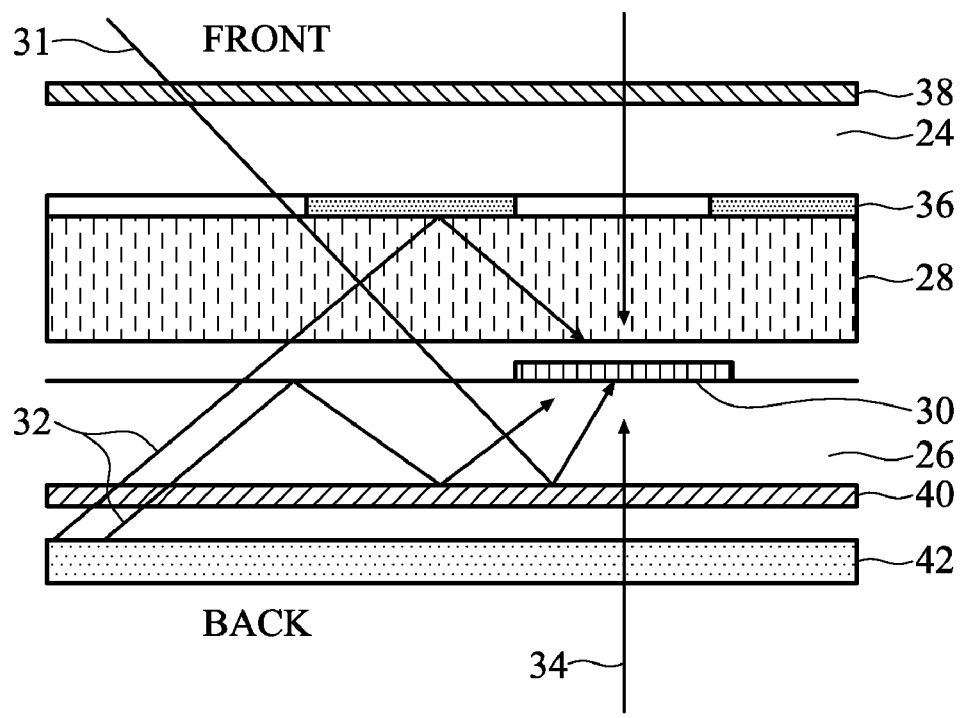
FIG. 1 shows a cross section through a known active matrix liquid crystal display using integrated light sensors, and which structure can be used in a display device of the invention.

FIG. 1 shows a simplified form the way in which the light sensors can be integrated within the display. In this example, the display is formed from two glass substrates 24,26 with a liquid crystal layer 28 between them. A light sensor 30 is fabricated on the lower substrate 26 which is closest to the backlight 42 (or backlight light guide) of the display. Ambient light from the front of the display is able to pass through the upper substrate 24 and the liquid crystal layer 28 to reach the light sensor 30.

The sensor can also receive ambient light which has passed through the display and has been modulated by the display pixels as indicated by the example light path 31. The sensor may also receive light from the backlight of the display as indicated by light paths 32 and 34, and which has passed through the lower substrate 26.

When measuring the ambient illumination, the contributions to the output signal from the modulated ambient light and from the backlight are undesirable and should be minimized and ideally eliminated.

It is possible to block the direct path of light from the backlight to the light sensor, for example by providing an opaque layer at the base of the thin film layers defining the light sensor. However, light from the backlight will be reflected or guided within the substrates of the display and will therefore still reach the sensors via an indirect path. This indirect light path is shown by arrows 32, whereas the direct path is shown as 34.

An alternative approach is to use a pulsed backlight (for example at 60 Hz), and to make the ambient light measurements during the "off" periods of the backlight. Of course, this does not allow the backlight to be driven to a continuous maximum brightness output.

For completeness, FIG. 1 shows a light masking layer 36. The use of a black mask layer is well known to shield the areas of the active plate through which unmodulated light can pass, and to shield the transistors as their operating characteristics are light-dependent. The top and bottom polarisers 38, 40 are also shown. The black mask layer has an opening to allow ambient light to reach the sensors 30.

The light sensors can be integrated within the display pixels so that light sensing can be implemented across the display area.

As explained above, when measuring the ambient illumination, the contribution derived from modulated ambient light and from light from the backlight should be cancelled.

One way to achieve this, which has been proposed by the applicant, is to introduce a second sensor which has a different sensitivity to the ambient light level but a similar sensitivity to the unwanted components of light.

Figure 2:
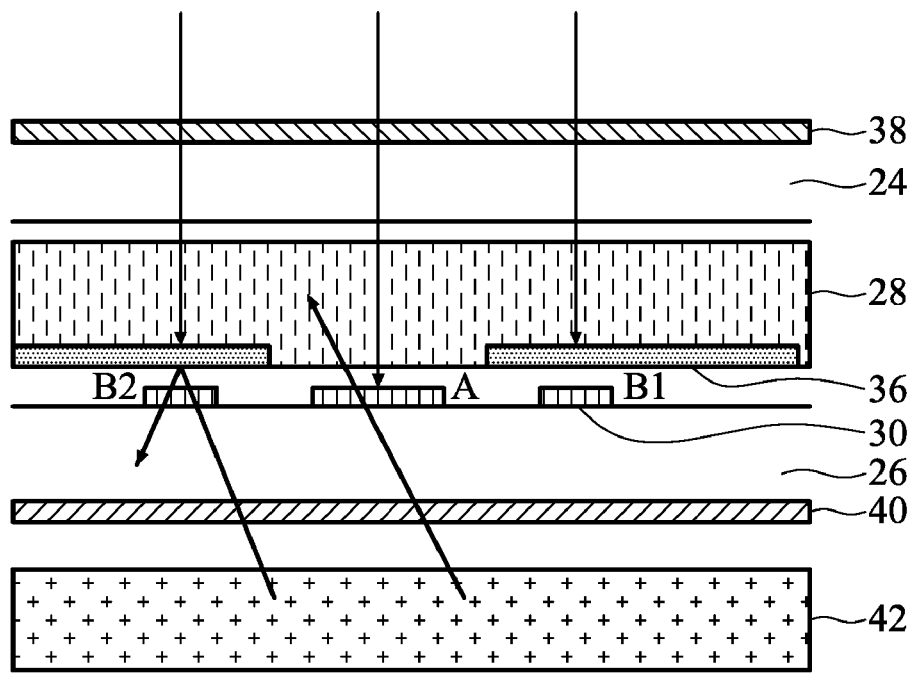
FIG. 2 shows a cross section through an active matrix liquid crystal display using multiple integrated light sensors proposed by the applicant.

An example of such an arrangement is shown in FIG. 2. The sensor arrangement 30 comprises a first sensor A which is exposed to the ambient illumination, while a second sensor B is covered by the light masking layer 36 (in this example shown beneath the liquid crystal layer rather than on top as in FIG. 1) so that its output contains a much lower contribution from the ambient light when compared to sensor A. In the simplest form, assuming the sensors A and B have the same area, a subtraction of the light sensed by sensor B from the light sensed by sensor A gives the ambient light level. Sensor B is illuminated only by light which has reached the sensor from the backlight, whereas as sensor A is illuminated by the ambient light as well as light which has reached the sensor from the backlight. The use of two sensors thus enables processing of the signals received so that a more accurate determination of the incoming (ambient) light level can be obtained.

Good matching of the characteristics of the sensors is an advantage so they may be arranged with a common centroid layout as shown in the Figure. Sensor B has the same area as sensor A but is divided into two equal parts, B1 and B2, which are located on either side of sensor A.

By designing two sensors such that their outputs contain quite different contributions from the wanted signal and similar contributions from the unwanted signal components, it is possible to increase the relative magnitude of the wanted signal to the unwanted signal components by subtracting the output of one sensor from the other.

The preferred examples of the invention use this type of light sensing capability to implement a touch sensitive input. Furthermore, the accuracy of interpretation of shadows is improved, by using a light modelling arrangement.

Figure 3:
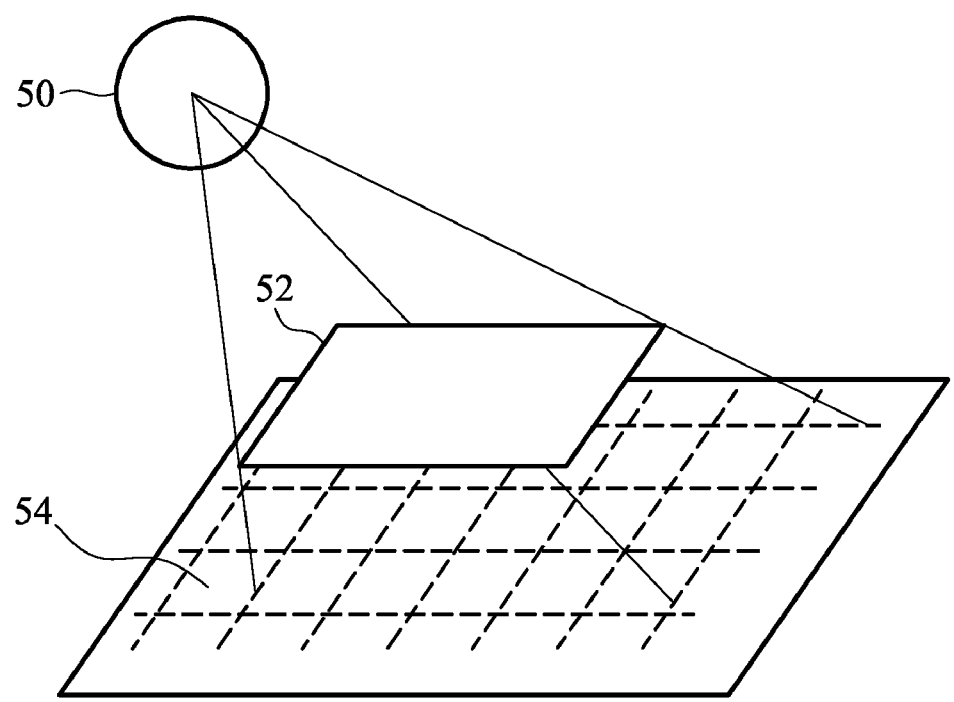
FIG. 3 is used to explain the method underlying the invention.

FIG. 3 shows the concept underlying the invention, for determining the nature, in particular the directional distribution, of the light incident on a device.

The ambient light is represented schematically as a light source 50. A shadow casting element 52 is provided in the path between the light source 50 and the active plate, which carries an array 54 of light sensors. The array of sensors 54 is used to characterise the ambient light, and is spaced a known distance behind the known shadow casting element 52.

FIG. 3 shows a simple system of generating and measuring a reference shadow for the illumination environment. This reference shadow can then be used to significantly aid the interpretation of shadows of unknown bodies (i.e. the user finger or stylus) in front of the screen, and thus increase reliability/robustness of interpreting shadow images to enable a touch input interface. In particular, the direction of the illumination being shadowed, or the directional distribution of the illumination being shadowed, allows more accurate interpretation of shadow maps. For example, if the reference shadow from the known shadow casting element indicates that the general direction of illumination is at a certain angle to the normal, then this information can be used to interpret a cast shadow from an object, in particular to provide an accurate estimate of the position of the object. Thus, the shadow as well as the light conditions is processed to derive an accurate estimate of the position of the object which has cast the shadow.

Figure 4:
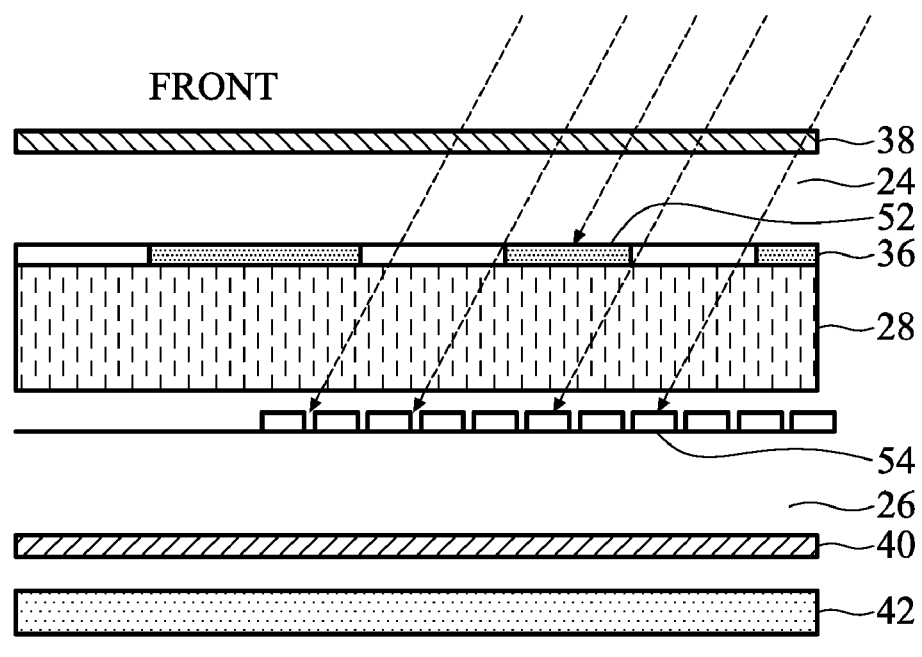
FIG. 4 is one example of implementation of the invention.

FIG. 4 shows one possible implementation of the sensor array and shadow casting element. The same reference numerals are used for the same components as in FIG. 2, and the description is not repeated for the same components.

In this example, the shadow casting element 52 is formed from the black mask layer 36, and the array of light sensors is formed on the active plate using the same technology and layers as the pixel circuits and the light sensors provided with the pixels. This provides a fully integrated solution.

The spacing between the black mask layer 36 and the pixel circuits and sensors may not be large enough to provide the desired resolution of detection. Thus, the shadow casting element 52 can instead be provided further from the sensors, for example on top of the (thicker) glass plate 24. Thus, the separation between the shadow casting element and the light sensor array can include a glass substrate on which the display is fabricated.

The light sensing elements of the array 54 will be of the same type and formed using the same process steps as the in-pixel light sensors, such as photodiodes or phototransistors.

There are many publications showing the integration of light sensors into the pixels of a display. This invention does not limit the type of light sensors that can be used, so many different possibilities will be apparent to those skilled in the art.

The processes required to fabricate the display device have not been described, as these will be routine to those of ordinary skill in the art.

In its simplest form, the processing implemented to model the light distribution can simply determine the centre of the shadow area, either as the darkest sensor area, or the centre of the darkened area, wherein the darkened area is determined by applying thresholds to identify the boundary of the shaded area. The position of this shadow area centre, compared to the position of the centre of the shadow casting element, then enables an average effective lighting direction to be determined. This lighting direction can then be used to reverse process the shadow cast by a user in order to estimate the position on the touch input surface.

The light sensor array 54 can however be used to derive more accurate information, for example it may model the light distribution as a number of point sources. The accuracy with which this modelling can be implemented will depend on the number of light sensors in the array 54. This can range from a small array (e.g. 10×10) to a much larger array (e.g. 100×100) with more complicated processing.

The example described above and shown in FIG. 3 uses a rectangular shadow casting element. However, many other designs for the shadow casting element are possible. Thus, a square shadow-casting element or a round one can used, although the principle is the same for many arbitrary shapes.

If there is a desire to minimize the number of sensor pixels used, then certain geometric shapes could improve the angle resolution for relatively simple light distributions, owing to "anti-aliasing" effects. For example, these anti-aliasing effects may be achieved by having a straight edge to the shadow casting element 52, which is skewed by one sensor-pixel-width along its length. A circular shadow-casting element will also provide these anti-aliasing effects.

The shadow casting element 52 can also be inverted, so as to have a central transparent region with an opaque surround, rather than an opaque element with a transparent surround. For example, a circular aperture can be provided in an opaque mask.

The angular/spatial resolution of the image created through an aperture is increased as the distance between the aperture and the sensor array is increased. The interpretation of the light distribution requires only a low resolution, so that the sensor array can spaced with a distance of the order of one aperture diameter.

Typically, an opaque shadow-casting element can be approximately 3 to 5 times the linear size of the spacing between the shadow-casting element 52 and the sensor array 54. An aperture shadow-casting element can be approximately the same linear size or smaller than the linear size of the spacing between the shadow-casting element and the sensor array.

As mentioned above, the shadow analysis from the shadow-casting element is not limited to simply providing an overall input light direction. Indeed, the analysis of the shadow can enable many different properties of the ambient lighting to be determined, in addition to a general direction of illumination. Using the example of a shadow-casting element in the form of an aperture, the following observations can assist in the interpretation of the shadow cast:

the pool of light cast on the sensor array will be composed of one or more (typically) overlapping circular pools of light.

for a distant point source such as the sun, the light pool will be essentially the same diameter as the aperture.

for nearer point sources, the light pool will be slightly larger owing to the divergence of the light (this is probably not significant enough to form part of the analysis). for diffuse light sources (such as overcast sky, or fluorescent tube lights) the light pool will be blurry-edged, and elongated in the case of a single strip-light.

The sensor array and analysis can be used to analyze (mathematically or algorithmically) the light-pool by "fitting" overlapping circles of light to the measured data from the sensor array. The centre point of the different circles is offset, and diameter variations can also be introduced, as well as edge-sharpness functions.

When analyzing shadows from a fingertip or stylus, there will typically be a small area of greatest density shadow, directly underneath the very tip of the stylus/finger, and with the hardest edge definition.

There may also be an extended shadow, for example cast by the full length of a stylus. In the case of very directional light (e.g. sunlight), the shadow cast by the stylus shaft may be almost as dense as under the stylus tip where the stylus/finger is touching the glass.

The type of lighting effect which is detected can be used to assist in the location of the touch input, in a number of different ways.

For example, for locating the user's intended point of contact (for example tracking a mouse pointer) then in diffuse light, a software algorithm can seek small areas of high density shadow, with hard-edges at least part-way around. This is because in diffuse light, there will only be a dark shadow directly beneath the point of contact.

With a stronger, more directional light, the density of the shadow at the stylus tip may not be markedly greater than that in the extended tail from the stylus shaft, and the sharpness falloff may also be less pronounced. In this instance, the light direction determined by the shadow sensor can be used to assist in the interpretation of the user input. For example, if the shadow-sensor indicates that the dominant light is coming from the user's left, for example, then this would provide an indication that the leftmost point of an extended shadow cast on the display will correspond to the user's intended point-of-interaction.

For two directional light sources of comparable strengths, there will be two (mainly half-brightness) shadows, but the point corresponding to the tip on the input surface, where both shadows overlap, would be a full-darkness shadow. The extra density at the tip would aid analysis, but again the shadow analysis can also indicate that the touch input analysis algorithm can expect two shadow tails extending away from that point.

For representation of the ambient light as a combination of light sources, it is appropriate for the analysis of the shadow cast to seek to identify up to 4 or 5 separate lights sources.

The analysis of the shadow image can comprise a full image acquisition of the angular size of the shadow with a high-resolution grid of sensor pixels, for example with a binary threshold applied to the pixel signals. However, analog light levels can also be used from the pixel sensors, so as to gauge the angular size of the light source, by measuring the "fuzziness" of the shadow.

The examples above use the shadow sensor to model the light distribution and direction from one or more light sources. However, the sensor array may contain a mixture of sensors of differing colour-sensitivity so that the colour or colour distribution of the incident light can also be analysed.

This mixture of colour sensors could be a Bayer colour filter mosaic (as used in CCD cameras), or else adjacent individual-colour sensor arrays could be used, each with their own shadow-forming elements, with each individual colour sensor array using a single overall colour filter.

Characterisation of the distribution/directionality of ambient light may have other applications in lighting, for example ambient-light sensing/simulation/reconstruction, and so-called ambient intelligence (guessing the location/environment) in portable consumer electronics devices. Colour sensing as mentioned above may be used in such an application to detect, for example, the diffuse hemisphere of blue sky distinct from the near point source of the yellow-white sun.

Thus, the invention in most general form relates to the detection/modelling of a light distribution for any purpose, not only for a touch input display device. For example, the analysis of the ambient light distribution can be used to control a display output, for example to generate lighting effects which depend on the ambient lighting. Mood lighting is one example, and the re-simulation of outdoor ambient light conditions indoors is another example.

Figure 5:
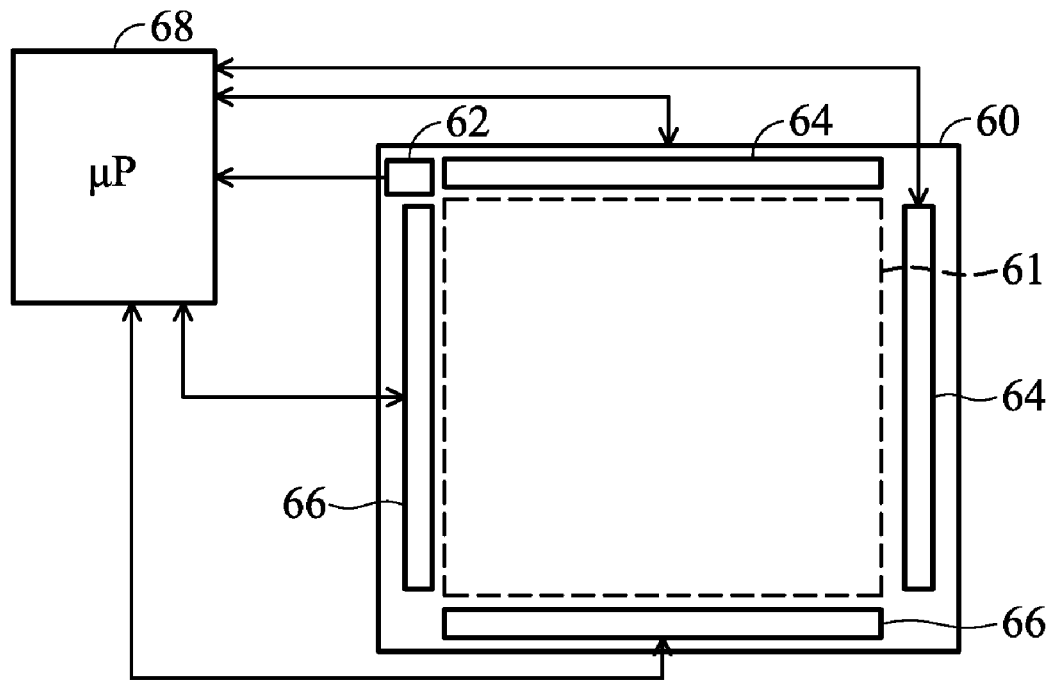
FIG. 5 is a first example of system that can use the light detection system and method of the invention.

FIG. 5 shows schematically a first example of system that can use the light detection system and method of the invention, in the form of a display 60 having a shadow based touch sensitive input. The display 60 has an area 61 in which a pixel array is formed. The light detection system is shown as 62, outside the pixel area, and comprises a first array of light sensors. A second array of light sensors is provided in the area 61, for example with a light sensor integrated into each display pixel circuit.

The display pixels are controlled by row and column driver circuits 64, and the light sensors are read by row and column readout circuits 66. These circuits are all under the control of the processor 68, which implements the light detection and modelling method explained above, as well as the interpretation of the touch input based on shadow detection within the second sensor array.

Figure 6:
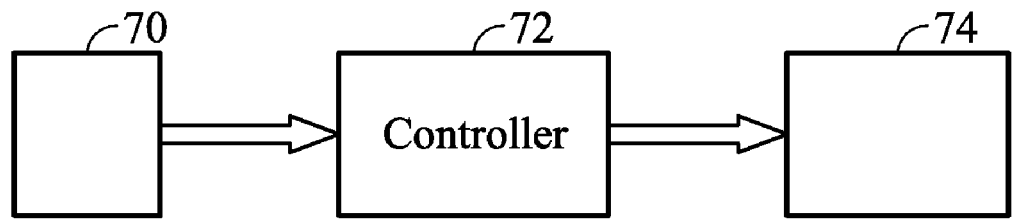
FIG. 6 is a second example of system that can use the light detection system and method of the invention.

FIG. 6 is a second example of system that can use the light detection system and method of the invention, in the form of a controlled light output device. The light detection system is shown as 70, and the signals are provided to a lighting controller 72 which implements the light detection and modelling method explained above, and then controls a light output device 74 in dependence on the ambient light characteristics, as explained above.

Various techniques are known for providing a more accurate estimate of incident ambient light levels, by processing multiple signals in order to compensate for the effects of incident light which is not representative of the ambient light, such as light from a backlight, or resulting from reflections within the structure. These techniques can also be applied when modelling the ambient light characteristics, and indeed when processing the user input.

Many different algorithms can be used to analyse the shadow from the known shadow-casting element, and from the unknown user input, instead of the example techniques outlined above, and these alternatives will be apparent to those skilled in the art.

Various modifications will be apparent to those skilled in the art . . . .

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A system for displaying an image, comprising a lighting device which comprises:
   an incident light detecting device adapted for detecting an incident light distribution, the incident light detecting device comprising:
      an array of light sensors;
      a shadow casting element spaced above the light sensor array, with the shadow casting element between the incident light to be detected and the sensor array; and
      a processor for interpreting a cast shadow detected by the light sensor array thereby to derive information relating to the directional distribution of the incident light; and
   a light output device, wherein the light output device is controlled in dependence on the information relating to the directional distribution of the incident light.

2. The system as claimed in claim 1, wherein the shadow casting element comprises a transparent aperture of known shape within an opaque mask, or an opaque mask of known shape within a transparent surround.

3. The system as claimed in claim 1, wherein the processor is adapted to derive information relating to the colour distribution of the incident light.

4. The system as claimed in claim 1, wherein the processor is adapted to derive a representation of the incident light as originating from one or more light sources in different positions.

5. The system as claimed in claim 1, comprising a shadow detection system, wherein the shadow detection system comprises:
 the incident light detecting device, wherein the array of light sensors comprises a first array of light sensors; and
 a second array of light sensors for detecting a shadow cast by a user of the system;
 wherein the shadow cast by the user of the system is interpreted using the information relating to the directional distribution of the incident light.

6. The system as claimed in claim 5, comprising a display device, wherein the display device comprises:
 the shadow detection system interpreting shadow of a touch input on the display device; and
 an array of display pixels.

7. The system as claimed in claim 6, wherein the array of display pixels comprises an array of pixel circuits, wherein the second array of light sensors are integrated with the pixel circuits.

8. The system as claimed in claim 7, wherein the display device comprises a liquid crystal display or an organic LED display.

9. The system as claimed in claim 7, wherein the shadow casting element and associated first array of light sensors are arranged outside a display output area.

10. The system as claimed in claim 7, wherein the shadow casting element and associated first array of light sensors are arranged at the edges and/or corners of a display output area.

11. A method of controlling an image display system, comprising:
 detecting an incident light distribution, comprising:
  using a shadow casting element spaced above a light sensor array to cast a shadow on the light sensor array; and
  interpreting the cast shadow detected by the light sensor array thereby to derive information relating to the directional distribution of the incident light; and
 controlling a light output device in dependence on the information relating to the directional distribution of the incident light.

12. The method as claimed in claim 11, further comprising:
 detecting a shadow cast by a user of the device; and
 interpreting the shadow cast by the user of the device using the information relating to the directional distribution of the incident light.

13. The method as claimed in claim 12, wherein the shadow cast by the user of the device is caused from a touch input, and the touch input is to the surface of a display device with touch input capability.

* * * * *